United States Patent
Feller

[15] 3,703,885
[45] Nov. 28, 1972

[54] ROTARY PISTON INTERNAL COMBUSTION ENGINES

[72] Inventor: Fritz Feller, "Shaldon" 231 Manor Way, Crewe, England

[22] Filed: Nov. 6, 1970

[21] Appl. No.: 87,421

Related U.S. Application Data

[63] Continuation-in-part of Ser. No. 807,263, March 14, 1969, abandoned.

[30] Foreign Application Priority Data

March 29, 1968 Great Britain..........15,150/68

[52] U.S. Cl. ...................123/8.11, 123/8.13, 418/61
[51] Int. Cl...............................................F02b 55/14
[58] Field of Search..........123/8.09, 8.11, 8.13, 8.33, 123/8.35; 418/61

[56] References Cited

UNITED STATES PATENTS 3,249,095   5/1966   Hamada....................123/8.11
3,288,120   11/1966  Lamm et al..............418/61 X
3,610,209   10/1971  Hess..........................123/8.09
3,244,154   4/1966   Lohner......................123/8.11
3,297,005   1/1967   Lamm........................123/8.13

FOREIGN PATENTS OR APPLICATIONS 1,301,614   7/1962   Germany..................123/8.09

Primary Examiner—Allan D. Herrmann
Attorney—Cushman, Darby & Cushman

[57] ABSTRACT

A rotary piston engine of the Wankel type in which the combustion chambers are constituted by recesses positioned in the leading half of each side of the piston and in which injection means is arranged to direct fuel into the recesses. The recesses are each provided with means so arranged that a rotational movement is imparted to the working fluid in a plane parallel to the base of the recess.

8 Claims, 8 Drawing Figures

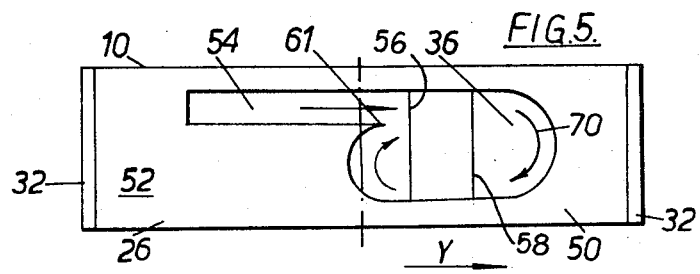
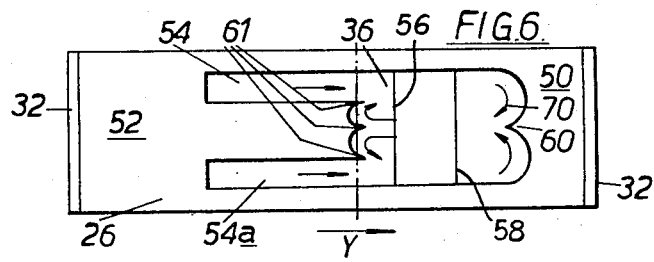
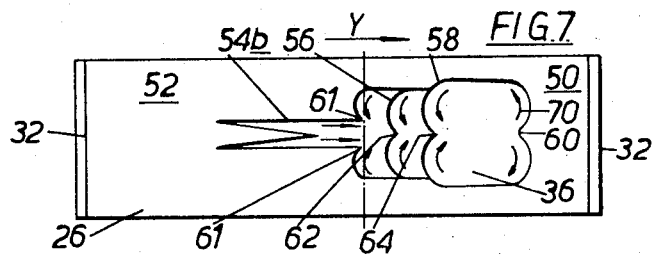
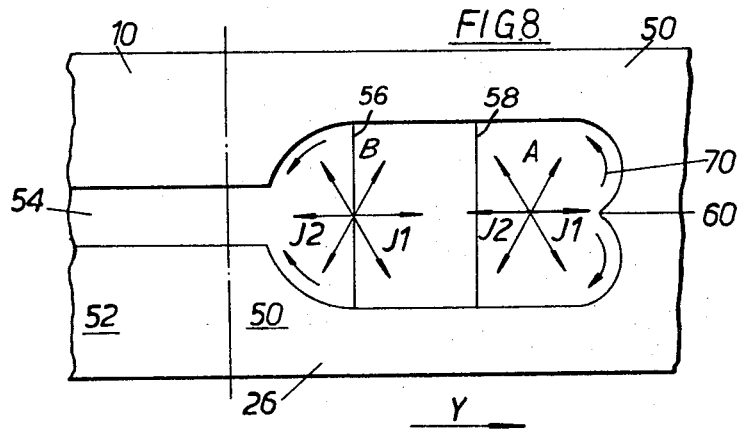

ROTARY PISTON INTERNAL COMBUSTION ENGINES

This application is a Continuation-in-part of application, Ser. No. 807,263 filed Mar. 14, 1969, and now abandoned.

This invention relates to rotary piston internal combustion engines of the type comprising a housing having $n$ lobes, a shaft extending axially of the housing, an $(n-1)$ANzsided piston rotatable in a planetary fashion within the housing about an eccentric provided on the shaft and injection means whereby fuel may be injected into the housing. Such a rotary piston internal combustion engine will hereinafter be referred to as a rotary piston engine of the type specified.

The invention is more particularly, but not exclusively, concerned with a rotary piston internal combustion engine adapted to operate on a compression-ignition cycle and having a three-sided piston rotatable within a housing having a two-lobed substantially epitrochoidal internal peripheral surface.

In this specification it is to be understood that the term "side," when used with reference to the piston of a rotary piston engine, refers to those faces of the piston which, together with the housing, define the working chambers of the engine.

In a rotary piston engine of the type specified, each side of the rotary piston may be divided into two equal portions by a line parallel to the axis of the piston: the portion of the leading position with respect to the normal direction of rotation of the piston will hereinafter be referred to as the leading half of the side of the piston, while the portion in the trailing position with respect to the normal direction of rotation of the piston will hereinafter be referred to as the trailing half of the side of the piston.

The object of the present invention is to provide a rotary piston engine of the type specified with a combustion chamber which will provide turbulence in the working fluid which is essential for efficient combustion, particularly in a compression ignition engine. Such turbulence is best achieved by providing means whereby a rotational motion is produced in the working fluid.

If the combustion chamber is provided in the center of the side of the piston it is extremely difficult to provide the combustion chamber with sufficient depth to allow for this rotational motion even in a plane substantially parallel to the base of the combustion chamber since a supply of cooling oil must be provided between the combustion chamber base and the piston bearing to protect the bearing from damage from excess heat.

According to the present invention therefore, a rotary piston engine comprises a housing having $n$ lobes, a shaft extending axially of the housing an $(n+1)$-sided piston rotatable in a planetary fashion within the housing about an eccentric provided on the shaft, injection means whereby fuel may be injected into the housing and inlet and exhaust port means whereby working fluid is admitted and exhausted from the housing, the pistons being provided in each of its sides with a combustion chamber in the form of a recess having sidewalls extending around a base wall, substantially the whole of which recess lies in the leading half of the side of the piston, wherein means are provided for imparting a rotational motion to the working fluid in the recess in a plane substantially parallel to the base wall of the recess.

Preferably there is provided at least one channel in each side of the piston extending across at least a part of the trailing half of the side of the piston in a direction parallel to the plane of the piston, and opening into the recess, and the side walls of the recess are so shaped whereby a rotational motion is imparted to the working fluid in the recess in a plane substantially parallel to the base wall of the recess.

The recess is preferably substantially oval in plan view.

Preferably there is provided at least one channel in the side of the piston which extends peripherally of the same in a direction of a plane extending transverse of the axis of the piston, the channel opening into the recess along an axis of the recess. Ancillary to the above there may be one or two channels extending in the side of the piston as aforementioned but communicating substantially tangentially with the recess.

The side wall of the recess opposite the or each channel is preferably provided with a re-entrant portion.

The side wall of the recess on the side of the region into which the channel opens is preferably provided with a further re-entrant portion.

The depth of the recess preferably increases by providing the base wall with at least one step in the direction of a line parallel to the plane of the piston from the trailing half to the leading half of the side of the piston, the or each step preferably being provided with a reentrant portion substantially opposite the reentrant portion of the side wall of the recess.

By locating the combustion chamber in the leading half of the side of the piston a deeper chamber can be provided than if the chamber was located in the center of the side of the piston. At the same time a reasonable sized channel for cooling air can be provided between the combustion chamber base wall and the bearing.

The invention will now be described, by way of example only, with reference to the accompanying drawings, in which:

FIG. 5 is a plan view of one side of an alternative embodiment of the rotary piston shown in FIG. 2; and FIG. 6 is a plan view of one side of a further embodiment of the rotary piston shown in FIG. 2, FIG. 7 is a plan view of one side of another embodiment of the rotary piston shown in FIG. 2 and FIG. 8 is an enlarged plan view of part of the side of the rotary piston shown in FIG. 2.

In the FIGS., the normal direction of rotation of the rotary piston is indicated by arrows Y.

Figure 1:
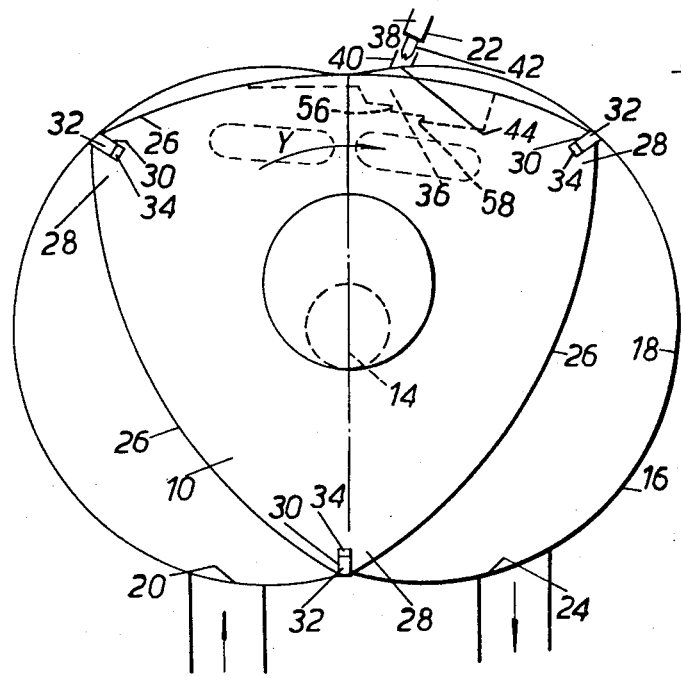
FIG. 1 is a somewhat diagrammatic sectional view of a rotary piston internal combustion engine in accordance with the present invention.

In FIG. 1 there is shown a rotary piston internal combustion engine adapted to operate on a compression-ignition cycle, comprising a three-sided piston 10 rotatably mounted on an eccentric 12 provided on a drive shaft 14 which is journalled in side plates (not shown) of a housing 16 having a two-lobed substantially epitrochoidal internal peripheral surface 18. The housing 16 is provided with an inlet port 20 whereby air, which has been precompressed, for example as disclosed in our British Pat. Specification No. 1,008,746 and 1,068,209, U.S. Pat. NOs. 3,228,183 or 3,371,654, may enter the housing 16 to be compressed therein by the piston 10, fuel injection means 22 whereby fuel may be injected into the compressed air in the housing 16 so as to initiate combustion, and an exhaust port 24 whereby exhaust gases may be expelled from the housing 16 by the piston 10.

The piston 10 has three working sides 26 between which three apices 28 are defined. Each apex 28 is provided with an axially extending groove 30 containing a radially movable sealing strip 32 which is urged into sealing contact with the internal surface 18 of the housing 16 by a slightly curved leaf spring 34 arranged in the bottom of the groove 30, while each side 26 is provided with a combustion chamber constituted by a recess 36 having sidewalls surrounded by a base wall, only one of which is shown in FIG. 1. The leading edge of the recess 36 is preferably positioned as close as is possible to the adjacent apex 28 without causing overheating of the sealing strip 32 in use.

The injection means 22 comprises an injector 38 arranged within a recess 40 in the housing 16, the recess 40 preferably being positioned, as will be hereinafter described, just beyond the junction of the lobes of the housing 16 in the direction of rotation of the piston 10. The injector 38 has a nozzle 42 provided with a plurality of fine orifices 44 each adapted to produce a jet of fuel, the size and distribution of the orifices 44 being chosen so that the jets of fuel are angularly spaced apart and are directed into the recess 36 as will be hereinafter described.

Figure 2:
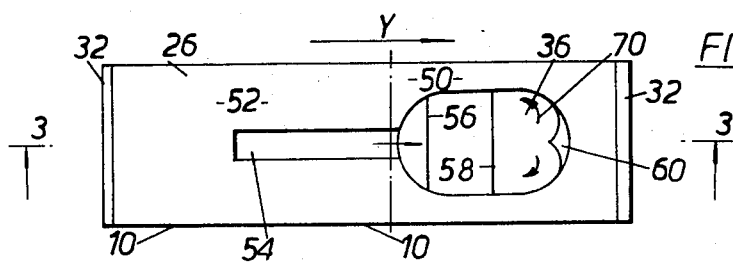
FIG. 2 is a plan view of one side of the rotary piston of the engine of FIG. 1.
Figure 3:
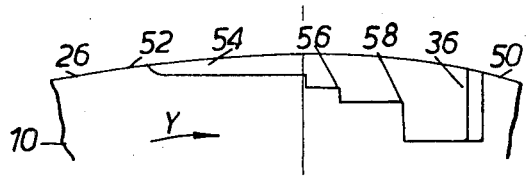
FIG. 3 is a section on the line 3—3 of FIG. 2.

Turning to FIGS. 2 and 3, one of the sides 26 of the piston 10 is shown in more detail. The side 26 may be divided by a line parallel to the axis of the piston into two halves, a leading half 50 and a trailing half 52: it can be seen that substantially the whole of the recess 36 (shown in solid lines) lies in the leading half 50.

The recess 36 is substantially oval in plane view, the length thereof in the direction of rotation of the piston 10 being determined as will hereinafter be described. A channel 54 is provided in the trailing half 52 of the side 26, which channel extends substantially circumferentially of the recess 36 and substantially parallel to the plane of the piston 10, and opens into the recess 36. The channel 54 extends across at least a part, e.g., about 166 to ½, of the trailing half 52 of the side 26.

The depth of the recess 36 increases towards the leading half 50 of the side 26 of the piston 10 in steps 56 and 58 in the base wall thereof. The depth of the channel 54 increases smoothly and continuously in the same direction.

The side wall of the recess 36 is provided with a reentrant portion 60 opposite the channel 54.

In operation, precompressed air is supplied to the inlet port 20 and is drawn into, and further compressed in the housing 16 by the piston 10. When the piston 10 reaches a position at which the shaft 14 is about 40°–60° before the top dead center position (the top dead center position is illustrated in FIG. 1), the injection of the fuel by the injection means 22 is commenced, and continued for about up to 30° of revolution of the piston 10.

The relative positions of the recess 36 and the injection means 22 during fuel injection are shown in FIG. 8.

Thus when the position of the leading edge of the recess 36 has been determined as hereinbefore described and the piston 10 is in the position at which it is desired to commence fuel injection, the injections means 22 is positioned in the housing 16 so that it will be disposed as shown at A with respect to the recess 36, i.e., so that the longest jet J1 of fuel in the direction of rotation of the piston 10 is directed into the recess 36. At the end of the fuel injection period, the injection means 22 is disposed as shown at B with respect to the recess 36; the trailing edge of the recess 36 is therefore positioned so that the longest jet J2 of fuel in the direction opposite to the direction of rotation of the piston 10 is directed into the recess 36. It can be seen, therefore, that the length of the recess 36 in the direction of rotation of the piston 10 is determined by the angular length of the fuel injection period and the total angular spread, in the plane of the piston 10, of the jets J1, J2 of fuel produced by the injection means 22.

The distribution and lengths of the jets of fuel produced by the orifices 44 of the injection means 22 are also shown in FIG. 8 it will be noted that those jets whose directions have a component extending axially of the piston 10 are shorter than those whose directions lie wholly in the plane of the piston 10. In fact the length of each jet is preferably approximately proportional to the distance in the direction of the jet between its respective orifice and the surface defining the recess 36, which ensures good fuel/air mixing.

It will be appreciated that substantially all the fuel injected by the injection means 22 is directed into the recess 36, ensuring that as little fuel as possible is deposited on the side 26 of the piston 10 surrounding the recess 36.

The pressure and elevated temperature of the air in the combustion space serve to initiate combustiin of the fuel.

As the piston 10 approaches the top dead center position, air which was contained in the space between the trailing half 52 of the side 26 and the housing 16 is forced to flow through the channel 54 into recess 36, the cross-sectional area of the channel 54 being chosen to produce high flow velocities. This flow hits the reentrant portion 60 of the wall of the recess effectively dividing the flow into two parts which parts are subsequently diverted to flow around the side walls of the recess in the opposite direction in the direction of the arrows 70. Thus a rotational motion is produced in a plane substantially parallel to the base wall of the recess which promotes further mixing of the air with the fuel. The steps 56, 58 assist by increasing the rotational motion.

The expanding combustion products drive the piston 10 round until the exhaust port 24 is uncovered, whereupon they are expelled from the housing 16 by the piston 10.

The arrangement of the present invention offers several advantages over hither to known arrangements. Thus where the combustion chambers of a rotary piston engine are constituted by centrally positioned recesses in the sides of the piston, the external radius of the piston bearing and the annular cooling structure coaxially surrounding the bearing only permit the formation of shallow, considerably elongated recesses.

The depth of these recesses is not consistent with good mixing and combustion, and they have a large surface area which leads to substantial heat losses. In the rotary piston engines of the present invention however, since the combustion chamber is constituted by a recess positioned in the leading half of the side of the piston, a deeper, more compact recess may be formed, which recess permits improved fuel/air mixing and lower heat losses. The fact that the depth available in the piston for the formation of the recess increases towards the piston apex is further exploited in the variation of the depth of the recess 36.

Additionally, the positioning of the recess in the leading half of the side of the piston enables the expanding combustion products to exert a greater turning force on the piston and reduces the possibility of a "back-fire" tending to reverse the direction of rotation of the piston.

Moreover, the arrangement of the present invention provides further improved mixing, in that clean air is forced from the space above the trailing half of the side of the piston to mix the burning fuel in the space above the leading half as hereinbefore described: a compact recess in the trailing half of the side of the piston would introduce the problem of inducing expanding combustion products to flow from the trailing half to the leading half, which not only increases the possibility of a "back-fire" as mentioned hereinbefore, but also has a deleterious effect on mixing.

Finally, the present invention reduces the leakage of combustion products between the working chambers of the engine via the recess in which the injection means is mounted, since the position of the injection means is such that when the piston apex seal passes it, the pressure difference across the seal comparatively small.

Figure 4:
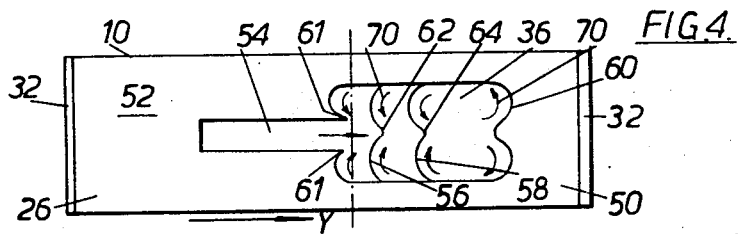
FIG. 4 is a plan view of one side of a further embodiment of the rotary piston shown in FIG. 2.

In FIG. 4 there is shown an alternative embodiment of the piston 10. The side wall of the recess 36 is still provided with a re-entrant portion 60 opposite the channel 54 but has two further re-entrant portions 61 on each side of the sidewall region into which the channel 54 opens. The steps 56 and 58 in the base wall of the recess 36 are also provided with reentrant portions 62 and 64 opposite the re-entrant portion 60.

These further reentrant portions 61 and 62 and 64 when provided further promote rotational motion of the working fluid in a plane substantially parallel to the base wall of the recess 36 as shown by arrows 70. It will be seen that a considerable degree of turbulence is created by the arrangement which ensures extremely good mixing of the fuel and air.

In FIG. 5 there is shown yet another embodiment of the piston 10. In this embodiment the channel 54 still extends parallel to the plane of the piston 10, but is offset so as to be tangentially disposed with respect to the recess 36 so that rotational motion is produced without a re-entrant portion 60.

FIG. 6 illustrates a further modification of the embodiment shown in FIG. 5. In this embodiment two channels 54 and 54a are each arranged tangentially to the recess 36. Reentrant portions 60 and 61 are provided on the walls of the recess 36 so that the fuel/air mixture entering the recess 36 via the channels 54 and 54a is deflected into the required rotational motion in a plane substantially parallel to the base of the recess 36.

A similar embodiment to that shown in FIG. 4 is shown in FIG. 7. In this embodiment the steps 56 and 58 of the base wall are provided each with a re-entrant portion 62 and 64. Reentrant portions 61 are provided on the same side of the recess as the slot 54b which in turn has slightly modified V-shaped portions at its end. The recess 36 nearer to the leading edge of the side walls of the piston is increased in width compared to the remainder of the recess.

It has been found that this particular embodiment provides particularly efficient combustion due to the rotational motion of the working fluid in a plane substantially parallel to the base of the recess in the direction of the arrows 70.

It will be appreciated that the invention is not only applicable to rotary piston internal combustion engines of the compression-ignition type; with suitable modification, the invention is applicable to any rotary piston engine of the type incorporating an ($n+1$)-sided piston rotatable within an $n$-lobed housing.

I claim:

1. A rotary piston engine comprising: a housing having $n$ lobes, a shaft extending axially of said housing, an eccentric provided on said shaft, a piston having ($n+1$) sides and rotatable in planetary fashion within said housing about said eccentric, injection means for injecting fuel into said housing, inlet port means and outlet port means respectively admitting and exhausting working fluid from said housing, a combustion chamber formed in each of the sides of said piston, each said combustion chamber being in the form of a recess having a sidewall surrounding a base wall and having a substantially oval shape in plan view with a major axis transverse to a plane through an axis of said piston and a minor axis, each said combustion chamber lying substantially in the leading half of the side of said piston, at least one channel extending across at least a part of the trailing half of each side of said piston in a direction parallel to the plane of the side of the piston and opening into the combustion chamber thereon, said sidewall of each said recess including means shaped to impart a rotary motion to working fluid in said recess in a plane substantially parallel to the base wall of the recess, and said base wall of each said recess comprising at least one step therein increasing the depth of said recess toward the leading half of the side of said piston.

2. A rotary piston engine as claimed in claim 1 wherein there is provided one channel on each of said sides of said piston extending and opening into the recess therein along the major axis thereof.

3. A rotary piston engine as claimed in claim 2 wherein there is provided at least one channel disposed on each of said sides of said piston, the channel extending substantially tangentially into the recess thereon.

4. A rotary piston engine as claimed in claim 1 wherein each side of said piston is provided with two channels therein, each of said channels extending substantially tangentially into the recess thereon.

5. A rotary piston engine as claimed in claim 1 wherein said means to impart rotary motion to the working fluid includes providing a portion of the sidewall of the recess substantially opposite the at least one channel with a re-entrant portion.

6. A rotary piston engine as claimed in claim 1 wherein the sidewall of the recess on each side of the region into which the channel opens is provided with a re-entrant portion defining the means for imparting rotary motion to the working fluid.

7. A rotary piston engine as claimed in claim 1 wherein said at least one step in the base wall of each recess is provided with a reentrant portion.

8. A rotary piston engine as claimed in claim 1 wherein said base wall of each recess comprises at least two steps, each step having a reentrant portion defining the means for imparting a rotary motion to the working fluid.

* * * * *